(12) United States Patent
Deju et al.

(10) Patent No.: US 12,274,961 B2
(45) Date of Patent: Apr. 15, 2025

(54) APPARATUS WITH IMPROVED GRIT REMOVAL

(71) Applicant: Smith & Loveless Inc., Lenexa, KS (US)

(72) Inventors: Lilunnahar Deju, Overland Park, KS (US); John K. Kelly, Overland Park, KS (US); Alexander P. Zuzelski, Lenexa, KS (US); Rodney S. Mrkvicka, Leawood, KS (US)

(73) Assignee: Smith & Loveless Inc., Lenexa, KS (US)

( * ) Notice: Subject to any disclaimer, the term of this patent is extended or adjusted under 35 U.S.C. 154(b) by 287 days.

(21) Appl. No.: 17/961,087

(22) Filed: Oct. 6, 2022

(65) Prior Publication Data

US 2024/0115977 A1    Apr. 11, 2024

(51) Int. Cl.
*B01D 21/24* (2006.01)
*B01D 21/00* (2006.01)
*B01D 21/02* (2006.01)
*C02F 1/00* (2023.01)

(52) U.S. Cl.
CPC ....... *B01D 21/245* (2013.01); *B01D 21/0039* (2013.01); *B01D 21/02* (2013.01); *B01D 21/2405* (2013.01); *B01D 21/2444* (2013.01); *C02F 1/00* (2013.01); *C02F 2001/007* (2013.01)

(58) Field of Classification Search
CPC .............. B01D 21/0036; B01D 21/245; B01D 21/0039; B01D 21/02; B01D 21/2405; B01D 21/2444; B01D 21/0042; B01D 21/0045; B01D 21/2411; B01D 21/0054; B01D 21/267; C02F 1/00; C02F 2001/007; C02F 2307/08; C02F 1/38; E03F 5/14
See application file for complete search history.

(56) References Cited

U.S. PATENT DOCUMENTS

2015/0083651 A1* 3/2015 Jons ................... B04C 5/22
                                                210/196
2021/0363745 A1   11/2021 Deju et al.

FOREIGN PATENT DOCUMENTS

WO   2016025483 A2   2/2016
WO   2023055369 A1   4/2023

OTHER PUBLICATIONS

Search Report from the UK Patent Office, for International Application No. GB2315333.1, dated Mar. 22, 2024, 1 page.

* cited by examiner

*Primary Examiner* — Bradley R Spies
*Assistant Examiner* — Jeannie McDermott
(74) *Attorney, Agent, or Firm* — Wood, Phillips, Katz, Clark & Mortimer

(57) ABSTRACT

A grit removal system with an annular grit removal chamber and a central hopper beneath the chamber bottom, including an opening through the chamber bottom to the hopper. Influent and effluent channels direct wastewater with grit into and out of the grit removal chamber. A plate over the chamber bottom opening has a first portion with a plurality of first openings therethrough and a second plate portion with a plurality of second openings therethrough, wherein the flow velocity for a given flow rate through the first openings is greater than the flow velocity for the given flow rate through the second openings.

12 Claims, 4 Drawing Sheets

APPARATUS WITH IMPROVED GRIT REMOVAL

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD OF THE INVENTION

The present invention relates to apparatuses for removing grit from wastewater, and more particularly to apparatuses in which grit separates in a grit removal chamber and in which such settled grit is accumulated in a grit collection or storage chamber beneath the grit removal chamber.

BACKGROUND OF THE INVENTION

Sewage treatment plants must, among other things, handle grit (i.e., heavy mineral matter present in sewage), which is one of the most unpredictable and difficult materials a sewage treatment plant must handle. Grit is principally made up of sand and soil, but frequently also contains cinders, coffee grounds, seeds, corn, and other coarse sediment, most if not all of which is hard and abrasive and cannot be treated, reduced in size, or eliminated by treatment methods. It wears pumps and other mechanical devices, is heavy, and accumulates in clarifiers, treatment basins, digesters, etc., where it must often be removed by hand.

Grit removal systems including grit removal chambers through which a flowing stream of wastewater is passed are well known for their capabilities in removing grit from wastewaters. Many such systems have included a storage hopper or chamber positioned beneath the removal chamber for collecting grit settled from the wastewater. However, in such systems the continuous flow of wastewater in the system can carry separated grit from the storage chamber back up into the grit removal chamber, thereby negatively impacting grit removal efficiency of the system.

The disclosed structure is directed to overcoming such problems.

SUMMARY OF THE INVENTION

In one aspect of the disclosure, a grit removal system includes a grit removal chamber having an annular wall encircling a bottom, a central hopper beneath the chamber bottom, and a central opening through the chamber bottom to the hopper. An influent channel directs wastewater with grit into the grit removal chamber through an influent chamber wall opening, and an effluent channel directs wastewater out of the grit removal chamber through an effluent chamber wall opening. A plate having first and second portions is over the chamber bottom central opening, wherein the first plate portion has a plurality of first openings therethrough and the second plate portion has a plurality of second openings there through, wherein the flow velocity for a given flow rate through the first openings is greater than the flow velocity for the given flow rate through the second openings.

In one form of this aspect of the disclosure, the first openings have at least one of size, shape and number which are different than the size, shape or number of the second openings.

In a further form of this aspect of the disclosure, grit flows toward the chamber bottom and onto the plate, wherein the plate is oriented so that a majority of grit flowing along the chamber bottom flows onto the first plate portion.

In yet another form of this aspect of the disclosure, the plate has an outer boundary surrounding the first and second plate portions with the first plurality of openings adjacent a first boundary portion and the second plurality of openings adjacent a second boundary portion, and the plate is oriented so that a majority of grit flowing along the chamber bottom and onto the plate passes over the first boundary portion.

In still another form of this aspect of the invention, the wastewater flow rate into the central hopper is substantially the same as the wastewater flow rate out of the central hopper.

In another aspect of the disclosure, a grit removal system has a grit removal chamber with an annular wall encircling a bottom, a central hopper beneath the chamber bottom and a central opening through the chamber bottom to the hopper, and an influent and effluent channels directing wastewater into and out of the chamber. A plate is over the chamber bottom central opening between the grit removal chamber and the central hopper and has first and second plate portions. The plate portions are split along a line with first plate portion having a plurality of first openings therethrough and the second plate portion having a plurality of second openings therethrough, where substantially all of the first openings have at least one of a size, shape and number different than the size, shape or number of the second openings. Grit flows toward the plate and the plate is oriented so that a majority of grit flowing along the chamber bottom flows onto the first plate portion.

In one form of this aspect of the invention, the plate is circular and split into the first and second plate portions along a radius.

In still another aspect of the disclosure, a grit removal system has a grit removal chamber having an annular wall encircling a bottom, and a central hopper beneath the chamber bottom and a central opening through the chamber bottom through to the hopper. Influent and effluent channels direct wastewater into and out of the chamber. A plate comprising first and second plate portions is over the chamber bottom central opening between the grit removal chamber and the central hopper. The plate has an outer boundary with the plate portions are split along a line, wherein the first plate portion has a plurality of first openings therethrough, the second plate portion has a plurality of second openings therethrough, and substantially all of the first openings have at least one of a size, shape and number different than the size, shape or number of the second openings. The wastewater carries grit inwardly toward the plate whereby the flow path for grit along the chamber bottom passes over the plate so that a majority of grit flowing into the central hopper from the grit removal chamber passes through the first openings.

In one form of this aspect of the disclosure, the flow velocity of wastewater through the first openings for a given wastewater flow rate is different than the flow velocity of wastewater through the second openings. In a further form, the wastewater flow rate through the plate openings into the central hopper is substantially the same as the wastewater flow rate through the plate openings out of the central hopper.

In yet another aspect of the disclosure, a divider between a grit removal chamber and a hopper beneath the chamber includes first and second semicircular arcuate plate members which together comprise a circular plate defining a central opening. The first plate member has a plurality of first openings therethrough, wherein substantially all of each of the first openings have an area of X. The second plate member has a plurality of second openings therethrough, wherein substantially all of each of the second openings have an area of at least Y. Y is greater than X.

In one form of this aspect of the disclosure, for a given flow rate of wastewater through the circular plate, the flow velocity through the first openings is greater than the flow velocity through the second openings.

Other objects, features, and advantages of the invention will become apparent from a review of the entire specification, including the appended claims and drawings.

DETAILED DESCRIPTION

Apparatuses as disclosed herein have a grit removal chamber which is generally cylindrical around a vertical center axis, with a central grit collection or storage chamber beneath the bottom of the grit removal chamber. Wastewater containing grit is directed into the grit removal chamber which directs flow in a path which generally spirals toward the chamber center axis where grit is captured and flows down into the collection or storage chamber. According to the advantageous structure disclosed herein, the flow of captured grit and wastewater from the grit removal chamber to the storage chamber is at a greater speed than the return flow (principally of wastewater from which grit has been collected in the storage chamber) from the storage chamber back up into the grit removal chamber.

Figure 1:
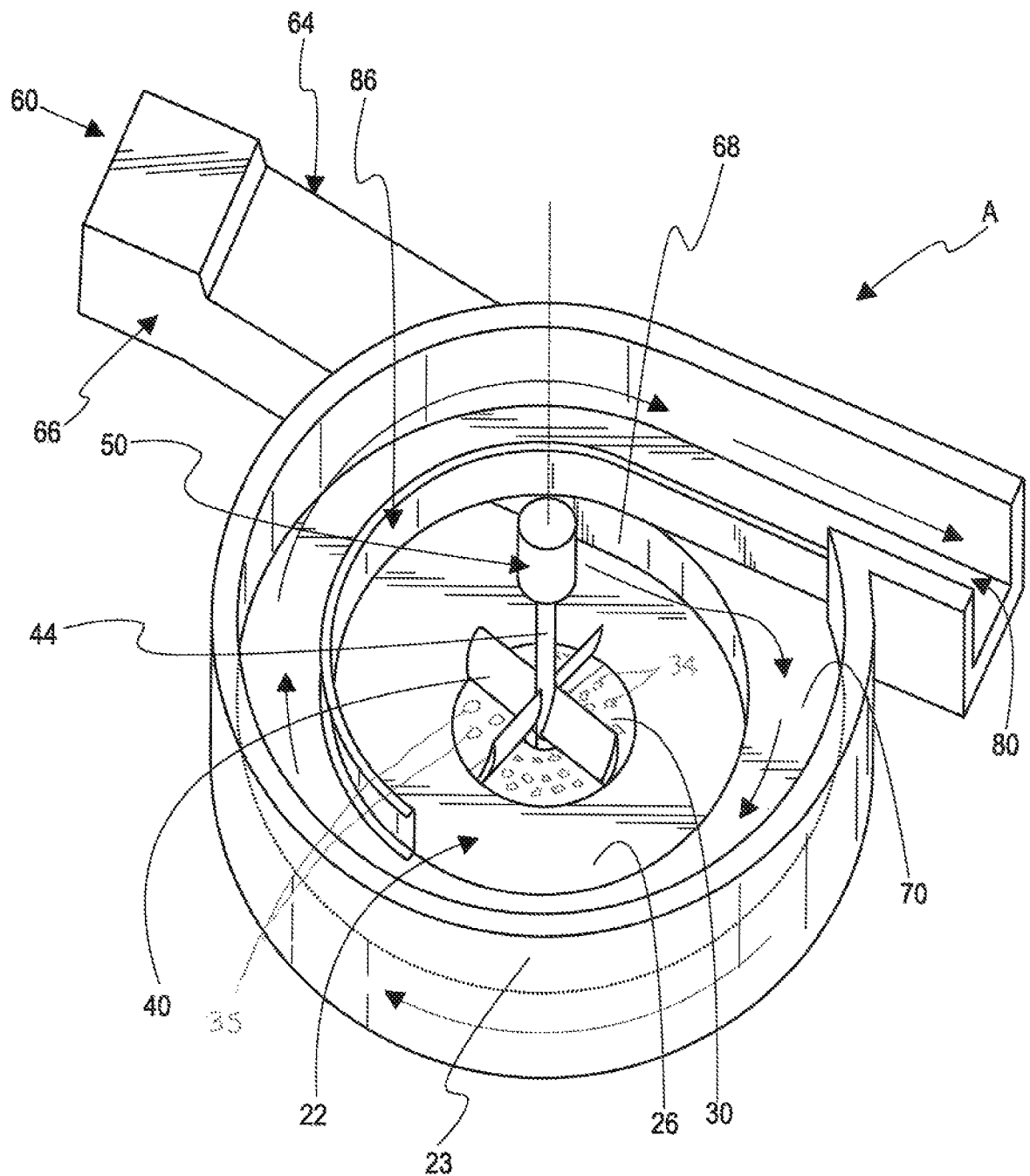
FIG. 1 is a perspective view of one grit removal system or apparatus with an advantageous separating plate.

FIG. 1 illustrates one apparatus A with which the advantageous structure disclosed herein may be used, the apparatus being such as disclosed in U.S. Pat. No. 9,932,731, the full disclosure of which is hereby incorporated by reference.

Specifically, a circular cylindrical grit removal chamber or basin 22 having an annular vertical side wall 23 is disposed immediately above and concentric with a cylindrical grit storage chamber 24 (see FIG. 2) of a lesser diameter. A substantially flat transition bottom surface or floor 26 including a removable plate 30 centered in the grit removal chamber 22 separates the storage and grit removal chambers 24, 22. As described in greater detail herein, openings 34, 35 through the plate 30 permit communication between the chambers 22, 24.

A multi-bladed propeller 40 may be mounted on a cylindrical shaft 42 for rotation with the upper portion of the shaft 44 connected, for example, to a suitable drive 50 for rotating the propeller 40.

An influent channel or inlet trough 60 has a covered downwardly extending influent flume portion 62 to introduce an influent wastewater or wastewater stream directly into a lower portion (i.e., the bottom) of the grit removal chamber 22 through an opening at the bottom of the grit removal chamber annular side wall 23. The flume portion 62 includes a sloped ramp at its bottom. The influent channel 60 may have an outer side wall 64 on one side of the bottom chamber opening and an inner side wall or baffle 68 on the other.

An annular, ring-shaped flange 70 may be secured or married around the grit removal chamber annular side wall 23 above the chamber floor 26. An effluent channel 80 allows wastewater to flow out of the grit removal chamber 22 through an opening at the top of the grit removal chamber annular side wall 23.

As is known of grit removers of the type such as illustrated in FIG. 1, wastewaters with grit flow through the influent channel 60 into the grit removal chamber 22 in which the wastewater and grit initially flows around the annular side wall 23 then follows a generally spiral path toward the center of the grit removal chamber 22. During this flow, the grit drifts/falls out of the wastewater down onto the grit removal chamber floor 26, and the spiral flow of the wastewater draws that grit toward the center of the grit removal chamber 22. There, wastewater and the grit will flow down through the openings 34, 35 in the plate 30 into the grit storage chamber 24 where the separated grit will fall down and accumulate in the storage chamber 24 from which it may be removed from time to time.

However, it should be recognized that since the storage chamber 24 is a closed chamber, wastewater which flows down into the storage chamber 24 will also necessarily flow back up through the openings 34 and/or 35 into grit removal chamber 22. Such return flow of wastewater can also carry some separated grit back up from the storage chamber 24 into the grit removal chamber 22.

As described in greater detail herebelow, in order to minimize grit being carried back up into the grit removal chamber 22, the plate 30 is designed such that the upward flow velocity of the wastewater from the storage chamber 24 will not carry the collected grit out of the storage chamber 24. For example, the plate 30 may be split into two portions, each portion including arrays of different openings 34 and 35 advantageously positioned so that most of the grit will generally pass through one array of openings 34 into the storage chamber 24, wherein the one array of openings is of a different size, shape and/or number than the other array of openings 35. Such differences between the arrays are selected so that the fluid velocity of the wastewater through the one array of openings into the storage chamber 24 will be greater than the fluid velocity of the wastewater through the other array of openings out of the storage chamber 24, with such difference functioning to prevent grit from being carried out of the storage chamber 24 with by the wastewater circulating back out of the storage chamber.

For example, as illustrated in various Figures herein, one array of openings 34 could consist of openings which are smaller in diameter than the diameter of the other array of openings (e.g., the diameter of the large openings 35 could be about 2.5 times the diameter of the small openings 34). While reference is made herein generally to different opening sizes, it should be understood that alternatively or additionally, the openings 34, 35 may be of a different shape and/or number (and cumulative cross-sectional areas) such that the flow velocity of wastewater going through one array of openings would be greater than the flow velocity of wastewater going through the other array of openings. Moreover, advantageously the plate 30 should be oriented in a particular grit removal apparatus so that the openings through which most grit would flow into the grit storage chamber 24 would be those configured to have the highest flow velocity with the other openings (through which wastewater would be expected to generally flow up out of the storage chamber 24) having the lowest flow velocity.

Figure 2:
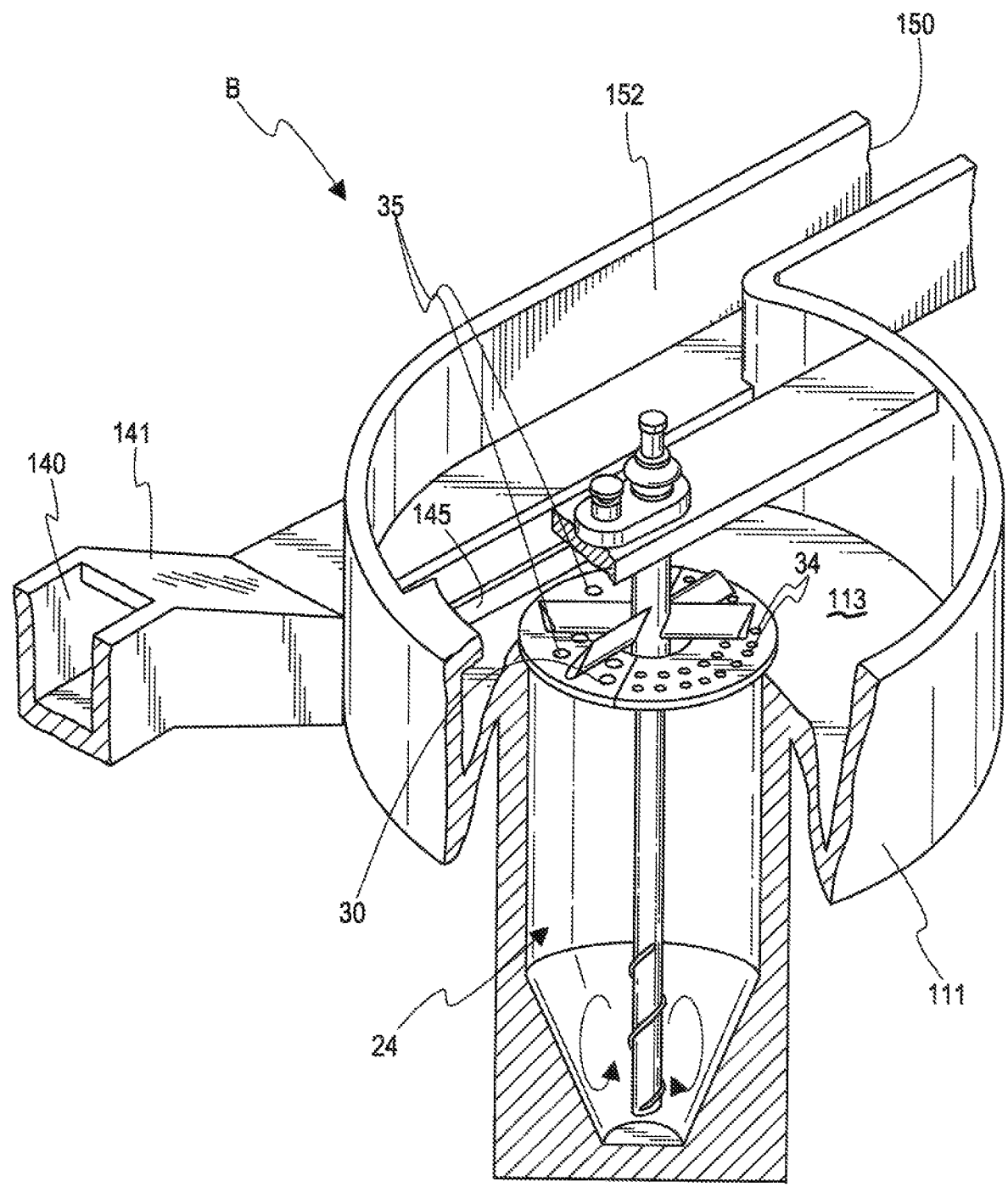
FIG. 2 is a perspective view of another grit removal apparatus with a cross-section illustrating the grit storage chamber.

FIG. 2 illustrates another exemplary apparatus B with which the advantageous plate configuration as disclosed herein may also be used. The apparatus B includes a grit removal chamber 111 disposed immediately above and concentric with a cylindrical grit storage chamber 24 of a lesser diameter. A floor 113 including a removable, plate 30 centered in the chamber 24 separates chambers 111 and 24. Openings in the center plate 30 as described in more detail hereafter permits communication between chambers 111 and 24.

An inlet trough 140 has a downwardly extending influent flume portion 141 to introduce an influent wastewater stream directly into a lower portion of grit removal chamber 111. An outlet trough 150 has an effluent flume portion 152 which extends into an upper portion of grit removal chamber 111 for removing an effluent wastewater stream from an upper portion of grit removal chamber 111 adjacent its outer periphery.

With this apparatus B, wastewater or sewage from which solid grit particles are to be removed is introduced into grit removal chamber 111 through inlet trough 140 and influent flume portion 141 as an influent stream. As the influent stream rotates around the grit removal chamber 111, grit and certain organics settle towards the bottom of the grit removal chamber 111 onto floor 113 and grit-free wastewater moves upwardly and exits through effluent flume portion 152.

The solid particles in suspension are carried near the floor 113 and as they settle they contact the floor. The settled particles are urged around the floor and radially inwardly where they drop through openings 34, 35 in the plate 30 and pass into grit storage chamber 24. The influent wastewater entering the storage chamber 24 also moves around the peripheral wall of the grit removal chamber 111 and is forced to the center by baffle member 145. The solid particulates settling in this stream contact the floor 113 and move around the grit removal chamber 111 and radially to the plate 30.

With grit removal apparatuses B such as described above, all of the influent flow is directed into a lower portion of the grit removal chamber 111 where the bulk of the solid particulate matter remains. The flow patterns within the grit removal chamber 111 are such that the solid particulates are carried toward the floor 113 and propelled toward the plate 30 in the center of the floor for transmission thereof (through holes 34 and/or 35) to the grit storage chamber 24.

Figure 3:
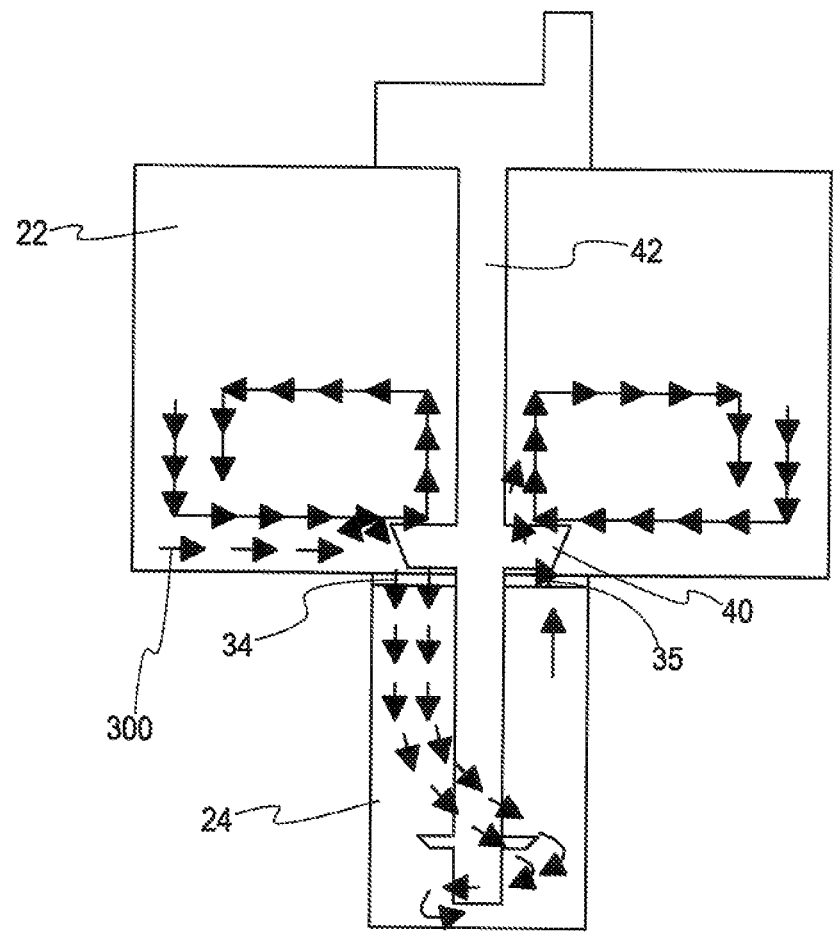
FIGS. 3-4 are side and top diagrams illustrating flow of wastewater through grit removal apparatuses such as illustrated in FIGS. 1-2.

FIG. 3 illustrates flow between the grit removal chamber 22 and the grit storage chamber 24 as viewed from the side. A multi-bladed propeller 40 mounted on a cylindrical shaft 42 is illustrated as directing fluid up at the center, generating a donut type of flow. Such flow acts to move grit 300 on the bottom of the grit removal chamber 22 toward the center of that chamber 22. With the high velocity (small) opening array 34 positioned on the side where most of the grit is separated, it can be seen that grit moving along the bottom of the grit removal chamber 22 to the openings with the higher flow velocity will pass into the storage chamber 24 at high velocity. By contrast, with the low velocity (large) opening array 35 positioned on the other side (where wastewater must flow out of the storage chamber 24), that low velocity flow will not significantly carry grit with it back into the grit removal chamber 22.

Figure 4:
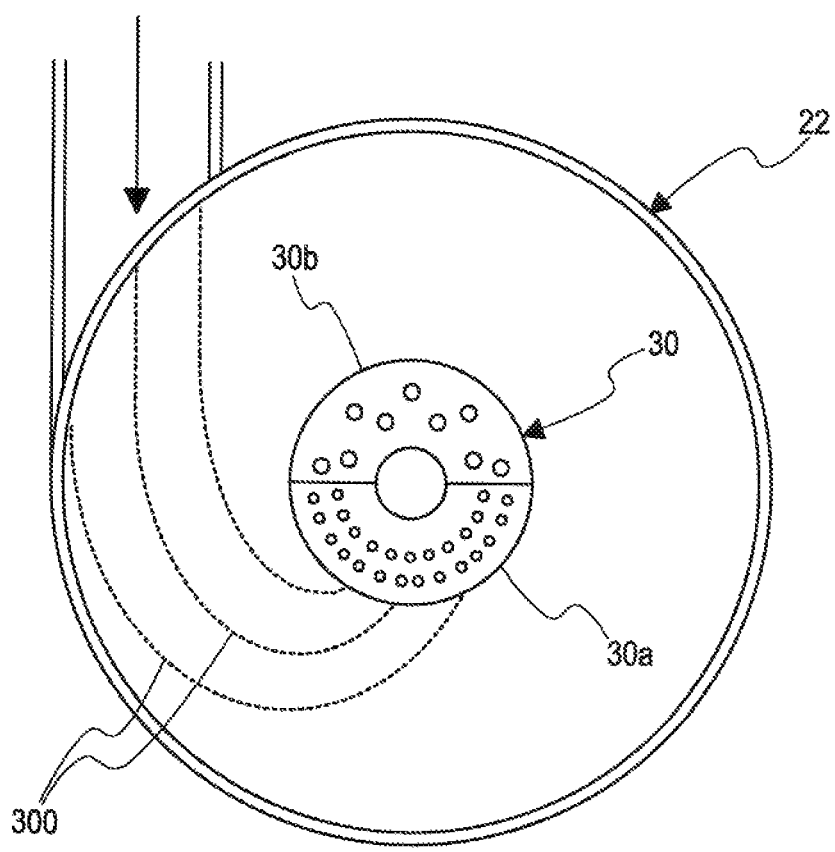
Figures 5, 6:
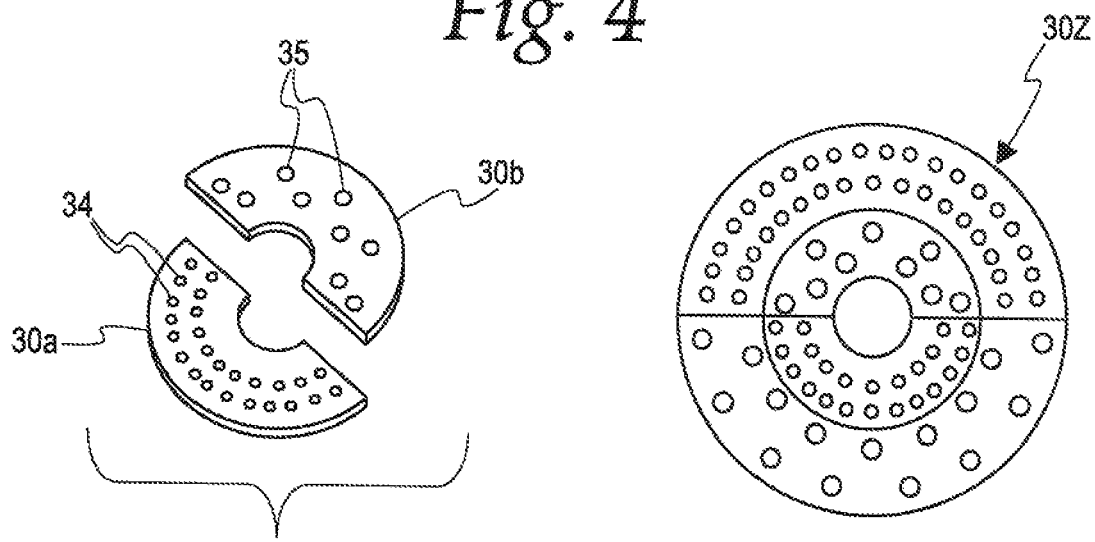
FIGS. 5 and 6 illustrate different embodiments of separating plates.

FIGS. 4-6 illustrate some plate configurations which may be used with different grit removal apparatuses in different conditions.

For example, FIGS. 4-5 show a split plate 30, with one plate portion 30a having a plurality of small openings 34 and the other plate portion 30b having a plurality of relatively large openings 35. By splitting the plate 30, it should be appreciated that installation of the plate 30 around a cylindrical shaft 42 may be easily accomplished. FIG. 4 in particular illustrates how the plate may be configured within an apparatus where the path of the grit 300 is generally as illustrated.

FIG. 6 illustrates a plate 30Z with different arrays of openings such as may be used with apparatuses having different grit flow paths, particularly showing that the high and low flow velocity openings need not be split between different plate halves.

In short, it should be appreciated that grit removal systems which direct grit toward the floor and a specific area in a grit removal chamber (e.g., 22 and 111 in the example apparatuses A and B described herein) and then down into a grit storage chamber 24 may advantageously incorporate plates 30 as described herein.

That is, it should be appreciated that grit will follow a certain path in the grit removal chamber 111 toward the opening to the storage chamber 24 (see, e.g., path 300 in FIGS. 3 and 4). In accordance with the disclosure herein, the grit path 300 is such that a majority of the grit will pass over the outer boundary of the plate portion 30a having the arrays of openings 34 which will result in a higher flow velocity than the openings 35 on the other plate portion 30b. It should thus be appreciated that the grit on that plate portion 30a will be caught up in the high velocity flow down into the storage chamber 24 through the openings 34. Such flow down into the storage chamber 24 may be facilitated by a propeller (see FIG. 3) in the storage chamber 24.

Moreover, it should be appreciated that an equilibrium of wastewater flow into and out of the storage chamber 24 must be obtained, such that much of the flow out of the storage chamber 24 will be up through the openings 35 in plate portion 30b. By configuring the openings 34 differently than the openings 35 as previously described, it should be appreciated that wastewater flowing back up through the openings 35 will flow at a lower velocity and therefore will be less likely to undesirably carry grit back up out of the storage chamber 24 (see the flow path 300 illustrated in FIG. 3).

In summary, it should be appreciated that in grit removal systems which direct grit toward a underlying storage chamber 24, use of a plate 30 having different openings 34, 35 as described herein will facilitate removal of the grit into the chamber and protect against such removed grit being reintroduced back into the system.

The invention claimed is:

1. A grit removal system comprising: a grit removal chamber having an annular wall encircling a bottom; a central hopper beneath said chamber bottom, said chamber bottom having a central opening therethrough to said hopper; an influent channel directing wastewater with grit into said grit removal chamber through an influent chamber wall opening; an effluent channel directing wastewater out of said grit removal chamber through an effluent chamber wall opening; first and second plate portions which together comprise a plate over said chamber bottom central opening, wherein said first plate portion is formed on one side of a radial line of the plate, the first plate portion has a plurality of first openings therethrough and said second plate portion is formed on the other side of the radial line of the plate, the second plate portion has a plurality of second openings there through, wherein said first openings have at least one of size, shape and number which are different than the size, shape or number of said second openings, wherein the flow velocity for a given flow rate through said first openings is greater than the flow velocity for said given flow rate through said second openings.

2. The grit removal system of claim 1, wherein grit flows toward the chamber bottom and onto said plate, wherein said plate is oriented so that a majority of grit flowing along said chamber bottom flows onto said first plate portion.

3. The grit removal system of claim 1, wherein said plate has an outer boundary surrounding said first and second plate portions with said first plurality of openings adjacent a first boundary portion and said second plurality of openings adjacent a second boundary portion, and said plate is oriented so that a majority of grit flowing along said chamber bottom and onto said plate passes over said first boundary portion.

4. The grit removal system of claim 1, wherein the wastewater flow rate into said central hopper is substantially the same as the wastewater flow rate out of said central hopper.

5. A grit removal system comprising: a grit removal chamber having an annular wall encircling a bottom; a central hopper beneath said chamber bottom, said chamber bottom having a central opening therethrough to said hopper; an influent channel directing wastewater into said chamber and an effluent channel directing wastewater out of said chamber; a plate comprising first and second plate portions, said plate being over said chamber bottom central opening between said grit removal chamber and said central hopper, wherein said plate portions are defined by a split along a radial line of the plate, said first plate portion has a plurality of first openings therethrough, said second plate portion has a plurality of second openings therethrough, and substantially all of said first openings have at least one of a size, shape and number different than the size, shape or number of said second openings; wherein grit flows toward said plate and said plate is oriented so that a majority of grit flowing along said chamber bottom flows onto said first plate portion.

6. The grit removal system of claim 5, wherein said plate is circular and split into said first and second plate portions along a radius.

7. A grit removal system comprising: a grit removal chamber having an annular wall encircling a bottom; a central hopper beneath said chamber bottom, said chamber bottom having a central opening therethrough to said hopper; an influent channel directing wastewater into said chamber and an effluent channel directing wastewater out of said chamber; a plate comprising first and second plate portions, said plate being over said chamber bottom central opening between said grit removal chamber and said central hopper, wherein said plate has an outer boundary, said plate portions are defined by a split along a radial line of the plate, said first plate portion has a plurality of first openings therethrough, said second plate portion has a plurality of second openings therethrough, and substantially all of said first openings have at least one of a size, shape and number different than the size, shape or number of said second openings; wherein the wastewater carries grit inwardly toward said plate whereby said flow path for grit along said chamber bottom passes over said plate so that a majority of grit flowing into said central hopper from said grit removal chamber passes through said first openings.

8. The grit removal system of claim 7, wherein the flow velocity of wastewater through said first openings for a given wastewater flow rate is different than the flow velocity of wastewater through said second openings.

9. The grit removal system of claim 8, wherein the wastewater flow rate through said plate openings into said central hopper is substantially the same as the wastewater flow rate through said plate openings out of said central hopper.

10. The grit removal system of claim 1, wherein said plate radial line is also radial with respect to said grit removal chamber annular wall.

11. The grit removal system of claim 5, wherein said plate radial line is also radial with respect to said grit removal chamber annular wall.

12. The grit removal system of claim 7, wherein said plate radial line is also radial with respect to said grit removal chamber annular wall.

* * * * *